UNITED STATES PATENT OFFICE.

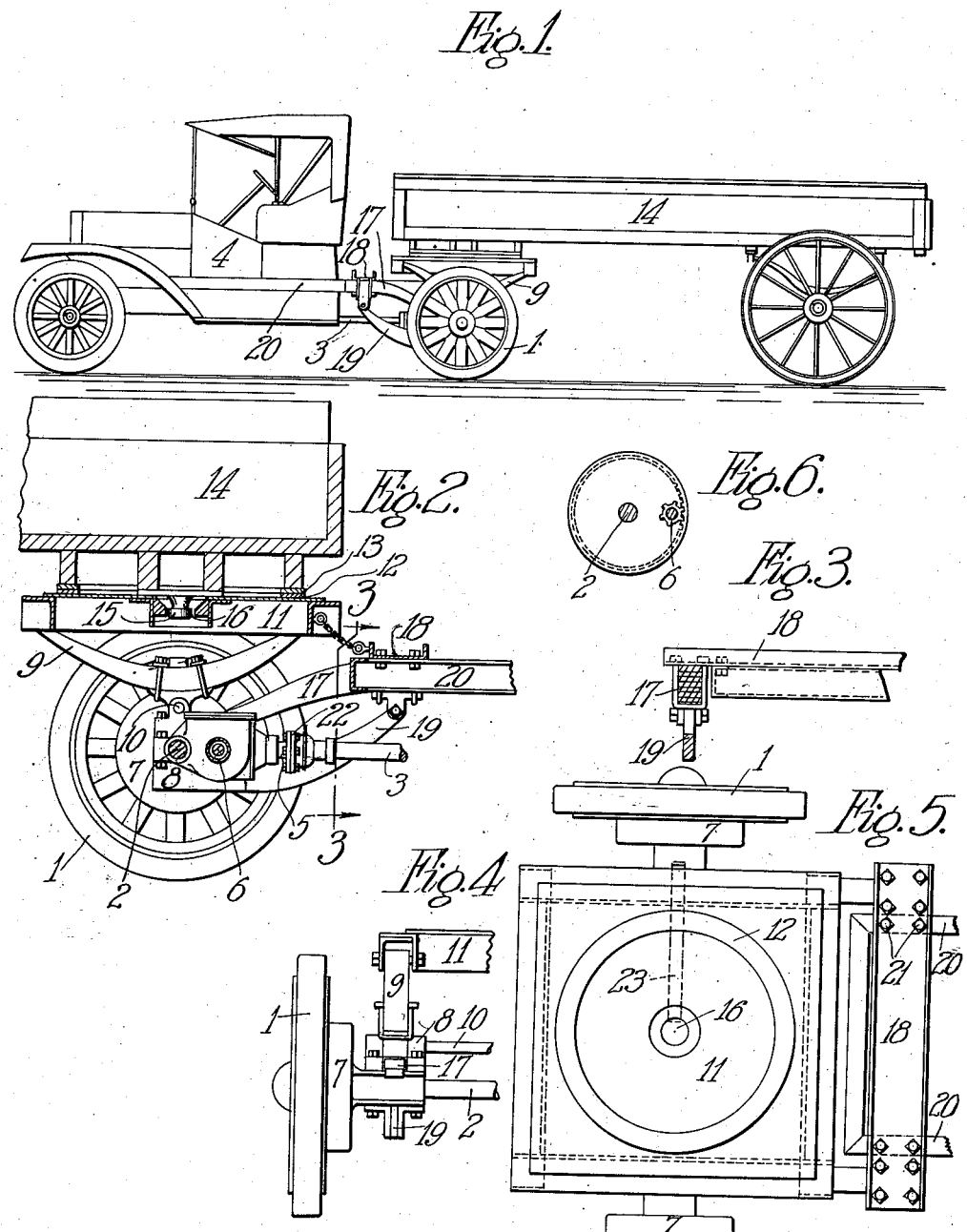

ERVING R. GURNEY, OF SPRINGFIELD, MASSACHUSETTS, ASSIGNOR TO KNOX MOTORS COMPANY, OF SPRINGFIELD, MASSACHUSETTS, A CORPORATION OF MASSACHUSETTS.

TRACTOR-TRAILER CONSTRUCTION.

1,296,655.  Specification of Letters Patent.  Patented Mar. 11, 1919.

Application filed July 5, 1917. Serial No. 178,699.

*To all whom it may concern:*

Be it known that I, ERVING R. GURNEY, a citizen of the United States of America, residing at Springfield, in the county of Hampden and State of Massachusetts, have invented certain new and useful Improvements in Tractor-Trailer Construction, of which the following is a specification.

This invention relates to an axle or "traction unit" designed to replace the rear axle of a pleasure car or light commercial automobile so as to adapt the latter for drawing a second vehicle in which heavy loads may be carried.

The present traction unit is based upon the construction shown and described in the patent to Martin, granted February 20, 1912, No. 1,018,248, but is not intended as a device to motorize a vehicle in itself, as with the Martin machine, but as a unit embodying an important feature of the Martin structure to be made and sold separately, and substituted at one and the same time for the rear axle and springs in an already existing automobile, and the front axle and springs of a trailer wagon, whereby the desired tractor-trailer combination may be made most efficiently from already existing vehicles not originally intended for such combination.

To this end, the present invention has several features of novelty and utility which will appear from the following description and claims.

In the drawings,

Figure 1 shows an automobile provided with the traction unit and engaged as in drawing a trailer;

Fig. 2 is a view, partly in section, of the traction unit and the means for connecting it to the automobile and trailer;

Fig. 3 is a section on line 3—3 of Fig. 2;

Fig. 4 is a view of one of the wheels of the traction unit showing spring and driving connections;

Fig. 5 is a plan view of the traction unit as shown in Fig. 2 with the trailer removed; and Fig. 6 is a detail view indicating the two shafts and the associated internal gear drive of the unit construction.

The traction unit consists of wheels 1, mounted upon an axle 2, which is provided with any suitable means for receiving power from the tail shaft 3 of an automobile 4. In the present instance, there is shown a stub shaft 5, connecting with differential gears driving a live axle 6, which is connected with each of the wheels by a pinion and an internal gear (Fig. 6). Suitable braking mechanism, adapted to be connected to the usual control levers of the automobile 4, is provided within the drum 7.

The housing 8 for the shafts 2 and 6 carries springs 9 pivoted to the housing at 10. These springs support a platform or turn-table 11 provided with a bearing plate 12 for the bearing plate or circle 13 of the trailer 14. From the circle 13 depends a king-pin 15, fitting freely within a hole 16 in platform 11. As the automobile 4 with the attached traction unit is driven, the trailer 14 will be drawn by means of the king pin, while a swiveling action is permitted to allow the vehicles to turn curves.

Springs 17 are attached to the housing 8 in a manner as to permit a slight motion relative thereto and carry at their other ends a cross-bar 18, here shown in the shape of a channel. Also attached to the housing 8 are torque arms 19, pivoted at their upper ends to the cross-bar 18, by which the cross-bar is held in position, although allowed to yield by springs 17. These springs 17 are made preferably lighter than springs 9 for two reasons. First, as springs 9 carry the weight of the load in the trailer, they must be heavy, while the springs 17 carry only the weight of the rear of the automobile 4. Second, a light spring prevents the passage of vibrations to a greater extent than a heavy spring, and it is therefore desirable to make springs 17 light so as to keep vibrations from the wheels 1 or from the load in the trailer away from the power plant.

When it is desired to apply the traction unit to an automobile, the body of the latter behind the front seat, and the rear axle with all its connections are removed. The rear of the automobile frame 20 is attached, as by bolts 21 to the cross-bar 18. Tail shaft 3, running from the transmission of the automobile, is connected to shaft 5 as by a universal joint 22, and the brake mechanism is joined to the control rods. It should be noted that the unit construction provided according to one feature of the invention can be readily adjusted back and forth on frame 20 until it is in position to be connected to the mechanism of the automobile to advantage. The trailer is unprovided with axle and front wheels, the same having been removed and is jacked up until the complete tractor is backed under it when the king pin 15 is lowered into the hole 16. A locking bar 23 may be provided to keep the king pin in position. Thus the unit has been most conveniently substituted for the rear axle and parts of an already existing automobile and the front axle and parts of a trailer, whereby the automobile as a tractor and a wagon as a trailer is most efficiently combined for tractor-trailer use by the unit substituted for the pre-existing parts of each.

As the ordinary automobile is designed to travel at higher speeds than that necessary or desirable for heavy loads, or to state it another way, as the automobile engine must rotate at a fairly high number of revolutions per minute, it is desirable that the internal gears hereinbefore mentioned should be so proportioned as to give a relatively large number of engine revolutions (say eight) for one of the wheels. In the ordinary automobile, the ratio is from three to five. By this provision, no change is necessary in the automobile to give a sufficiently high engine speed other than the substitution of the traction unit for the rear wheels.

It will be seen that the traction unit may be applied to any automobile, irrespective of the detailed design thereof, the location of bolts 21 allowing the various lengths of tail shaft 3.

By the provision of the unit described, it is possible to change pleasure cars of an out-of-date model which in themselves would be incapable of either supporting or drawing a heavy load, into tractors of great commercial utility.

What I claim is—

1. A traction unit having in combination an axle, driving wheels connected therewith, a plurality of springs on the axle, some of which are more resilient than others, a fifth wheel device supported by the springs of least resiliency, and attaching means connected to the springs of greatest resiliency, the unit being constructed and arranged for attachment to existing motor vehicles by substituting the one unit for the rear axle and springs of an automobile and the front axle and springs of a trailer vehicle, and an internal gear drive mechanism on the axle to connect the driving wheels with the motor, whereby a tractor-trailer combination may be made by the substitutions stated, said mechanism designed to render the combination suitable for hauling heavy loads when connected to a motor originally designed for pleasure vehicles.

2. A traction unit adapted to replace the rear axle of an existing automobile, comprising, an axle, driving wheels connected therewith, springs on the axle, a fifth wheel device supported by said springs, other springs of greater resiliency than the first-named springs and connected to said axle, a cross-bar to the ends of which the last-named springs are fixedly connected, and torque arms connecting said axle and cross-bar, the latter being adapted for attachment to the frame of an automobile after its rear axle has been removed, and driving means adapted to connect said wheels to the power plant of the automobile.

ERVING R. GURNEY.